United States Patent
Fearing

[15] 3,666,844
[45] May 30, 1972

[54] ALKYLARYLPOLYOXYALKYLENE N-HYDROXYALKYL PHOSPHORAMIDATES

[72] Inventor: Ralph Fearing, Bardonia, N.Y.
[73] Assignee: Stauffer Chemical Company, New York, N.Y.
[22] Filed: Feb. 23, 1968
[21] Appl. No.: 707,446

[52] U.S. Cl............................260/951, 8/142, 260/2.5 AJ, 260/970, 260/984
[51] Int. Cl..........................C07f 9/22, C08g 22/44
[58] Field of Search.................................260/951

[56] References Cited

UNITED STATES PATENTS 2,971,976  2/1961  Brust ....................................260/951

Primary Examiner—Charles B. Parker
Assistant Examiner—Anton H. Sutto
Attorney—Paul J. Juettner, Wayne C. Jaeschke and Martin Goldwasser

[57] ABSTRACT

Compounds of the formula:

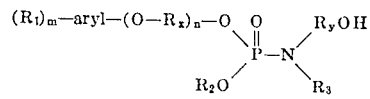

wherein $R_1$ is an alkyl radical of from 1 to 30 carbon atoms, $R_2$ is a lower alkyl and lower chloroalkyl, phenyl, benzyl, or $R_1$-Aryl-$(O\&R_x)_n$-radical, $R_3$ is hydrogen, lower alkyl, phenyl, benzyl, or $-R_yOH$, $R_x$ and $R_y$ are alkylene bridges of from 2 to 6 carbon atoms, $m$ is an integer of 1 or 2, and $n$ is an integer of from 1 to 100, and -Aryl- is phenylene, or naphthylene which are useful as dry-cleaning detergents.

12 Claims, No Drawings

ALKYLARYLPOLYOXYALKYLENE N-HYDROXYALKYL PHOSPHORAMIDATES

The present invention relates to novel high molecular weight hydroxyalkyl phosphoramidates which are useful as dry-cleaning detergents.

In accordance with the present invention, there are provided novel high molecular weight hydroxyalkyl phosphoramidates of the formula:

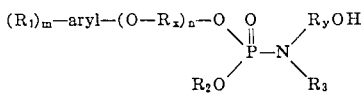

wherein $R_1$ represents an lower alkyl lower chloro alkyl radical preferably from four to 30 carbon atoms, $R_2$ is alkyl, aryl, aralkyl or $$(R_1)_m\text{-Aryl-}(O\text{-}R_x)_n\text{-}$$

$R_3$ is hydrogen, lower alkyl, aryl, aralkyl or $-R_yOH$, $R_x$ and $R_y$ are alkylene bridges of from two to six carbon atoms, m is an integer of one or two, and n is an integer of from one to 100. These new compounds are useful as dry-cleaning detergents and also as flame retardants for polyurethane foams.

The compounds of the present invention can be prepared by transesterifying diesters of phosphonic acid with an alkylarylpolyoxyalkylene glycol followed by reacting the so-formed phosphonate with an alkanol amine in the presence of carbon tetrachloride (Todd reaction) to obtain the desired phosphoramidate. The reaction sequence is as follows:

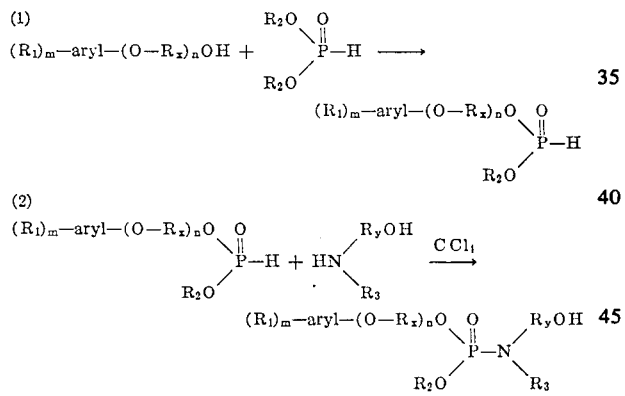

This method is given only as illustrative of a synthetic route to prepare the compounds of the present invention, and applicant is not intended to be limited thereto.

The alkyl or dialkylarylpolyoxyalkylene glycols of the formula $(R_1)_m\text{-Aryl-}(OR_x)_n OH$ are known materials and easily prepared by known prior art methods. These alkylene groups $R_x$ can be straight chain or branched chain, and preferably contain from two to six carbon atoms in a continuous chain connecting the oxygen atoms of the polyether omitting the carbon atoms in branched chains. As is known, the alkylene $R_x$ groups can be varied within the same polyoxyalkylene glycol portion of the compound. Illustrative of the various alkylene $R_x$ groups are: ethylene, propylene, isopropylene, butylene, pentylene, hexylene, heptylene, octylene and the like though ethylene is preferred. These are given as illustrative and applicant is in no way intended to be limited thereto.

The number of either units in the alkylaryloxyalkylene glycol can range from one to 100. Preferably and for detergent use, the number of ether units is maintained at an average of from about four to about 10 and more preferably from about four to about eight.

The aryl portion of the alkyl or dialkylarylpolyoxyalkylene glycol can be any phenolic type moiety which can be alkoxylated to the polyoxyalkylene ether unit. Illustrative of such moieties are phenylene, napthylene, and non-alkyl substituted derivatives thereof.

The alkyl group of the alkyl or dialkyl arylpolyoxyalkylene glycol portion of the compound, e.g., $R_1$, when only one alkyl group is attached to the aryl group, can be any alkyl group but preferably an alkyl group having at least 8 carbon atoms and more preferably from eight to 30 carbon atoms, and when two alkyl groups are attached to the aryl group, the alkyl group preferably has at least four carbon atoms and more preferably four to five carbon atoms. Illustrative of the alkyl radicals are methyl, ethyl, propyl, and those of the preferred group are butyl, pentyl, hexyl, octyl, nonyl, decyl, hendecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl and tricontyl. Most preferably, the alkyl group is octyl or nonyl when one alkyl group is present on the aryl group and butyl or pentyl when two are present.

The alkylarylpolyoxyalkylene glycol is used to form a phosphonate of the formula:

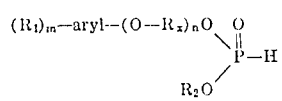

wherein $R_2$ can be hydrogen, e.g., the monoester, or alkyl, aryl or alkyl and, $(R_1)_m\text{-Aryl-}(O\text{-}R_x)_n\text{-}$, e.g., the diester. Preferably, the diester phosphonate is used as precursor in the preparation of compounds of the invention and more preferably where $R_2$ is $R_1\text{-Aryl-}(O\text{-}R_x)_n$. The di($R_1\text{-Aryl-}(O\text{-}R_x)_n$- ester is conveniently formed by transesterifying a phosphonic acid diester by using two moles of glycol per mole of diester. To prepare phosphonates wherein $R_2$ is other than $(R_1)_m\text{-Aryl-}(O\text{-}R_x)_n\text{-}$, a diester phosphonate having the desired $R_2$ group is initially prepared followed by subsequent transesterification with one equivalent of the alkyl aryl glycol. Illustrative of diesters of phosphonic acid which can be transesterified are: dimethyl, diethyl, dipropyl, dibutyl and the like, diphenyl, dibenzyl, bis(chloroethyl) and the like, phosphonate diesters.

The alkylarylpolyoxyalkylene glycol phosphonate is then reacted with a primary or secondary alkanol amine of the formula:

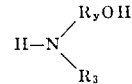

wherein $R_y$ is an alkylene bridge of from two to six carbon atoms as defined hereinbefore with regard to $R_x$ and $R_3$ is hydrogen, alkyl, aryl, aralkyl or $-R_yOH$. Preferably $R_3$ is $R_yOH$ and $R_y$ is an alkylene bridge of two carbon atoms. Suitable alkanol amines which can be used in preparing the compounds of the present invention can be illustrated by: ethanolamine, propanolamine, butanolamine, pentanolamine, hexanolamine, ethyl ethanolamine, propyl ethanolamine, phenyl ethanolamine, benzene ethanolamine, diethanolamine, dipropanolamine, dibutanolamine, ethanolpropanolamine, and the like. The foregoing are given as illustrative and applicant is in no way intended to be limited thereto.

The reaction between the alkanol amine and the phosphonate can be easily accomplished O,O- bis(isooctylphenylhexaoxyethylene), N,N-bis(hydroxyethyl)phosphoramidate, Todd Reaction. This reaction is well known in its basic form which is set out in the literature article by Atherton, Openshaw and Todd, J. Chem. Soc., 1945, p. 660 (London, 1945) and also in Belgium Pat. No. 649,879 issued in 1964.

Illustrative of the various compounds included within the present invention are: O,O-bis bis(hydroxylethyl) O,O-bis(nonylphenyltetraoxyethylene)N-hydroxyethylphosphoramidate, O,O-bis(eicosylphenyldecaoxyethylene), N-ethyl,N-hydroxyethylphosphoramidate, O,O-bis(triaconylphenyloctaoxyethylene) N,N-bis (hydroxyethyl)phosphoramidate, O,O-bis(isooctyl-1,4-naphthylhexaoxyethylene) N,N-bis(hydroxyethyl) phosphoramidate, O-dibutylphenylhexaoxyethylene, O-ethyl N,N-bis(hydroxyethyl) phosphoramidate, O,O-bis(dipentylphenylhexaoxyethylene) N,N-bis(hydroxyethyl) phosphoramidate.

The present invention is illustrated in the Examples which follow:

EXAMPLE 1

O,O-bis(nonylphenylhexaoxyethylene)N,N-bis-(hydroxyethyl)phosphoramidate is prepared by admixing 305 grams (0.3 moles) of O,O-bis(nonylphenylhexaoxyethylene)hydrogen phosphonate with 150 milliliters of carbon tetrachloride and 65 grams (0.6 moles) diethanolamine and heating the reaction mixture at 40° C. for 2 hours. After standing overnight, the reaction mixture separated into two layers, the bottom being the product layer. The bottom layer, after separation, is diluted with additional carbon tetrachloride. The carbon tetrachloride is stripped by distillation leaving two layers, the smaller of which is removed after dilution with toluene. 150 milliliters of hexane is then added to the final product to facilitate product separation. Yield is 324.5 grams (0.29 moles) of product or a 97% yield. Analysis shows a nitrogen content of 1.3% as against a theoretical content of 1.25%.

EXAMPLE 2

Using the reaction procedure of Example 1, O,O-bis(nonylphenyltetraoxyethylene)N,N-bis(hydroxyethyl) phosphoramidate is prepared by reacting 210 grams (0.25 moles) O,O-bis(nonylphenyltetraoxyethylene)hydrogen phosphonate and 51 grams (0.48 moles) of diethanolamine in the presence of 150 milliliters of carbontetrachloride. 234.6 grams of product (99% yield) were obtained.

EXAMPLE 3

Using the reaction procedure of Example 1, O,O-bis(isooctylphenylhexaoxyethylene)N,N-bis(hydroxyethyl) phosphoramide is prepared by reacting 244 grams (0.25 moles) of O,O-bis(isooctylphenylhexaoxyalkylene)hydrogen phosphonate with 51 grams (0.48 moles) of diethanolamine in the presence of 150 milliliters of carbon tetrachloride. Substantially quantitative yield is obtained.

The compounds of the present invention are useable as wet detergents and dry cleaning detergents and also as fire retardant agents in polyurethane foams.

What is claimed is:

1. Compounds of the formula:

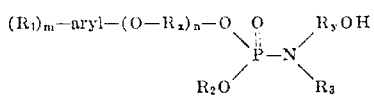

wherein $R_1$ is an alkyl radical of from one to 30 carbon atoms, $R_2$ is a lower alkyl and lower chloroalkyl, phenyl, benzyl, or $R_1$-Aryl-$(O-R_x)_n$- radical, $R_3$ is hydrogen, lower alkyl, phenyl, benzyl, or -$R_y$OH, $R_x$ and $R_y$ are alkylene bridges of from two to six carbon atoms, m is an integer of one or two, and n is an integer of from one to 100, and -Aryl- is phenylene, or naphthylene.

2. Compounds as recited in claim 1 wherein $R_1$ is octyl or nonyl, and m is one.

3. Compounds as recited in claim 1 wherein $R_1$ is butyl or pentyl and m is two.

4. Compounds as recited in claim 1 wherein $R_2$ is $R_1$-Aryl-$(O-R_x)_n$-.

5. Compounds as recited in claim 1 wherein $R_3$ is -$R_y$Oh.

6. Compounds as recited in claim 5 wherein $R_y$ is an alkylene bridge of two carbon atoms.

7. Compounds as recited in claim 5 wherein Aryl is phenylene.

8. Compounds as recited in claim 5 wherein $R_x$ is an alkylene bridge of two carbon atoms.

9. Compounds as recited in claim 5 wherein n is an integer of from four to 10.

10. O,O-bis(isooctylphenylhexaoxyethylene)N,N-bis(hydroxyethyl)phosphoramidate.

11. O,O-bis(nonylphenyltetraoxyethylene)N,N-bis(hydroxyethyl)phosphoramidate.

12. O,O-bis(nonylphenylhexaoxyethylene)N,N-bis(hydroxyethyl)phosphoramidate.

* * * * *

PO-1050
(5/69)

UNITED STATES PATENT OFFICE
CERTIFICATE OF CORRECTION

Patent No. 3,666,844      Dated May 30, 1972

Inventor(s) Ralph Fearing

It is certified that error appears in the above-identified patent and that said Letters Patent are hereby corrected as shown below:

ABSTRACT, line 7, the formula "$R_1$-Aryl-O&$R_x$)$_n$-radical" should read --$R_1$-Aryl-O-$R_x$)$_n$-radical--.

Column 1, line 16, the words, "lower alkyl lower chloro" should be deleted; line 16, after the word "is" insert --lower-- and after the word "alkyl," insert --lower chloro alkyl--; line 66, the word "either" should read --ether--.

Column 2, line 64, after the word "accomplished" insert --using the--; lines 64, 65 and 55, the words "O,O-bis(isooctylphenylhexaoxyethylene), N,N-bis(hydroxyethyl)phosphoramidate," should be deleted; line 72, after the word "are:" insert --O,O-bis(isooctylphenylhexaoxyethylene), N,N-bis(hydroxyethyl)phosphoramidate--; line 72, delete "O,O-bis bis(hydroxyethyl)."

Column 4, Claim 5, line 28, the formula "-RyOh" should read -- -RyOH --.

Signed and sealed this 5th day of December 1972.

(SEAL)
Attest:

EDWARD M. FLETCHER, JR.
Attesting Officer

ROBERT GOTTSCHALK
Commissioner of Patents